US 9,360,915 B1
Jun. 7, 2016

(12) United States Patent
Schuttenberg

(10) Patent No.: US 9,360,915 B1
(45) Date of Patent: Jun. 7, 2016

(54) DYNAMICALLY CONTROLLING CLOCKING RATE OF A PROCESSOR BASED ON USER DEFINED RULE

(71) Applicant: MARVELL INTERNATIONAL LTD., Hamilton (BM)

(72) Inventor: Kim Schuttenberg, Gilbert, AZ (US)

(73) Assignee: MARVELL INTERNATIONAL LTD. (BM)

( * ) Notice: Subject to any disclaimer, the term of this patent is extended or adjusted under 35 U.S.C. 154(b) by 428 days.

(21) Appl. No.: 13/870,042

(22) Filed: Apr. 25, 2013

Related U.S. Application Data

(60) Provisional application No. 61/638,707, filed on Apr. 26, 2012.

(51) Int. Cl.
*G06F 1/32* (2006.01)

(52) U.S. Cl.
CPC .............. G06F 1/3203 (2013.01); G06F 1/324 (2013.01)

(58) Field of Classification Search
CPC .............. G06F 9/4401; G06F 2217/84; G06F 2217/62; G06F 17/5045; G06F 17/5031; G06F 1/3203; G06F 1/26; H03K 3/84
USPC .................... 713/500, 322, 320; 327/291, 117
See application file for complete search history.

(56) References Cited

U.S. PATENT DOCUMENTS

| | | | |
|---|---|---|---|
| 6,351,756 B1* | 2/2002 | Taniyoshi | 708/103 |
| 8,400,202 B2* | 3/2013 | Minaki | G06F 1/04 327/291 |
| 2002/0027428 A1* | 3/2002 | Jung | H02M 3/33523 323/283 |
| 2005/0155001 A1* | 7/2005 | Kinoshita et al. | 716/2 |
| 2008/0061855 A1* | 3/2008 | Cha et al. | 327/291 |
| 2008/0094117 A1* | 4/2008 | Stoler et al. | 327/162 |
| 2008/0282012 A1* | 11/2008 | Ishimi | 710/306 |
| 2009/0037712 A1* | 2/2009 | Mallik | G06F 1/3203 713/1 |
| 2011/0161715 A1* | 6/2011 | Momoi et al. | 713/401 |
| 2011/0239035 A1* | 9/2011 | Cha et al. | 713/503 |
| 2013/0002317 A1* | 1/2013 | Frantzeskakis et al. | 327/156 |

\* cited by examiner

*Primary Examiner* — Thomas Lee
*Assistant Examiner* — Santosh R Poudel

(57) ABSTRACT

Systems, methods, and other embodiments associated with controlling a clocking rate of a processor clock are described. According to one embodiment, an apparatus includes a register, a selector, and a clock gate. The register stores a set of bits arranged in a clocking pattern. In response to receiving an edge of a first clock signal, the selector selects a bit of the set of bits in the register. With each edge of the first clock signal, the selector selects a next bit in the clocking pattern. The clock gate implements a conjunction of the selected bit and the edge. The clock gate then outputs the conjunction of the selected bit and the edge as a second clock signal.

17 Claims, 8 Drawing Sheets

Clocking Pattern 910

Derived Signal 920

Longer Clocking Pattern 930

Resulting Derived Signal 940

DYNAMICALLY CONTROLLING CLOCKING RATE OF A PROCESSOR BASED ON USER DEFINED RULE

CROSS REFERENCE TO RELATED APPLICATIONS

This claims the benefit of U.S. provisional application Ser. No. 61/638,707 filed on Apr. 26, 2012, which is hereby wholly incorporated by reference.

BACKGROUND

A computer typically contains an internal clock (e.g., a master clock) that regulates the rate at which instructions are executed and synchronizes all the various components of the computer. The rate at which instructions are executed is commonly referred to as a clock speed or clock rate. The clock rate is typically determined by the frequency of a master clock signal of a master clock, such as an oscillator crystal. For example, the master clock may produce a fixed sine wave. Electronic circuitry translates the master clock signal into a square wave at the same frequency and transmits the clock signal to the components of the computer, such as processors, memories, and so on.

Clock rates for the computer components are determined at the end of the manufacturing process through testing of the computer components. However, the clock rate of a component can be adjusted. For example, a processor can be overclocked by running the processor at a higher clock rate than specified by the manufacturer. Overclocking the processor causes the processor to run faster thereby increasing the power of the processor. Underclocking, also known as downclocking, is the practice of adjusting a component to run at a lower clock rate than specified by the manufacturer. Underclocking is commonly used to reduce the power consumption of a processor, increase battery life, reduce heat emission, and the like.

SUMMARY

In general, one aspect of this specification discloses an apparatus associated with controlling a clocking rate of a processor clock. The apparatus includes a register, a selector, and a clock gate. The register stores a set of bits arranged in a clocking pattern. In response to receiving an edge of a first clock signal, the selector selects a bit of the set of bits in the register. With each edge of the first clock signal, the selector selects a next bit in the clocking pattern. The clock gate implements a conjunction of the selected bit and the edge. The clock gate then outputs the conjunction of the selected bit and the edge as a second clock signal.

In general, another aspect of this specification discloses a method for controlling a clocking rate of a processor clock. The method includes storing a set of bits. The set of bits are arranged in a clocking pattern. A bit of the set of bits is selected in response to receiving an edge of a first clock signal. The bits are selected when edges of the clocking pattern are encountered. For each of the edges of the first clocking signal, a conjunction of the selected bit and the edge is implemented. The conjunction of the selected bit and the edge are output as a second clock signal.

In general, in another aspect, this specification discloses an integrated device for controlling a clocking rate of a processor clock The integrated device includes a plurality of processors and a clocking pattern logic. The clocking pattern logic includes a register, a selector, and a clock gate. The register stores a set of bits arranged in a clocking pattern. In response to receiving an edge of a first clock signal, the selector selects a bit of the set of bits in the register. With each edge of the first clock signal, the selector selects a next bit in the clocking pattern. The clock gate implements a conjunction of the selected bit and the edge. The clock gate then outputs the conjunction of the selected bit and the edge as a second clock signal.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

In many devices (e.g., computers, tablets, cell phones) it is desirable to minimize the total amount of power consumed by a processor, such as a central processing unit (CPU) or a graphics processing unit (GPU), while still having the ability to rapidly respond to requests for additional processing power. Conventionally, a master clock provides a master clock signal to synchronize derivative clocks associated with individual processors. A derivative clock has a clock controller that includes a clock dividers and a phase locked loop (PLL). The derivative clock is typically located on the same piece of silicon as a processor, but is separate from the processor. The derivative clock has a signal derived from the master clock. The clock controller controls the derived signal for the processor and synchronizes changes to the derivative clock signal using the master clock signal.

It is often desirable to change the power and performance characteristics of a processor by changing the clock signal supplied to the processor. Accessing the clock controller to change a clock signal typically involves the invocation of a device driver, several device type memory requests, and most importantly, a delay to resynchronize the system after the change. Thus, changing a clock signal can take tens or hundreds of microseconds, and the synchronization process may degrade the performance of other devices in the system even if their power and performance characteristics are not being changed. For maximum battery life and performance, it is desirable to change the power and performance characteristics of a processor more quickly than can be implemented by the conventional approach.

Described herein are examples of systems, methods, and other embodiments that provide rapid, fine grained control of a processor clock. A clocking pattern is used to specify which master clock edges to propagate and which clock edges to ignore when producing a derived clock signal. Different clocking patterns can be specified for different operating conditions and desired performance parameters and to achieve different objectives, such as reduced power consumption and noise abatement. Clocking patterns can be specified on a per processor or per component basis. Rules may be enforced on clocking patterns to ensure proper operation of the processor or component being clocked by the derived clock signal.

Figure 1:
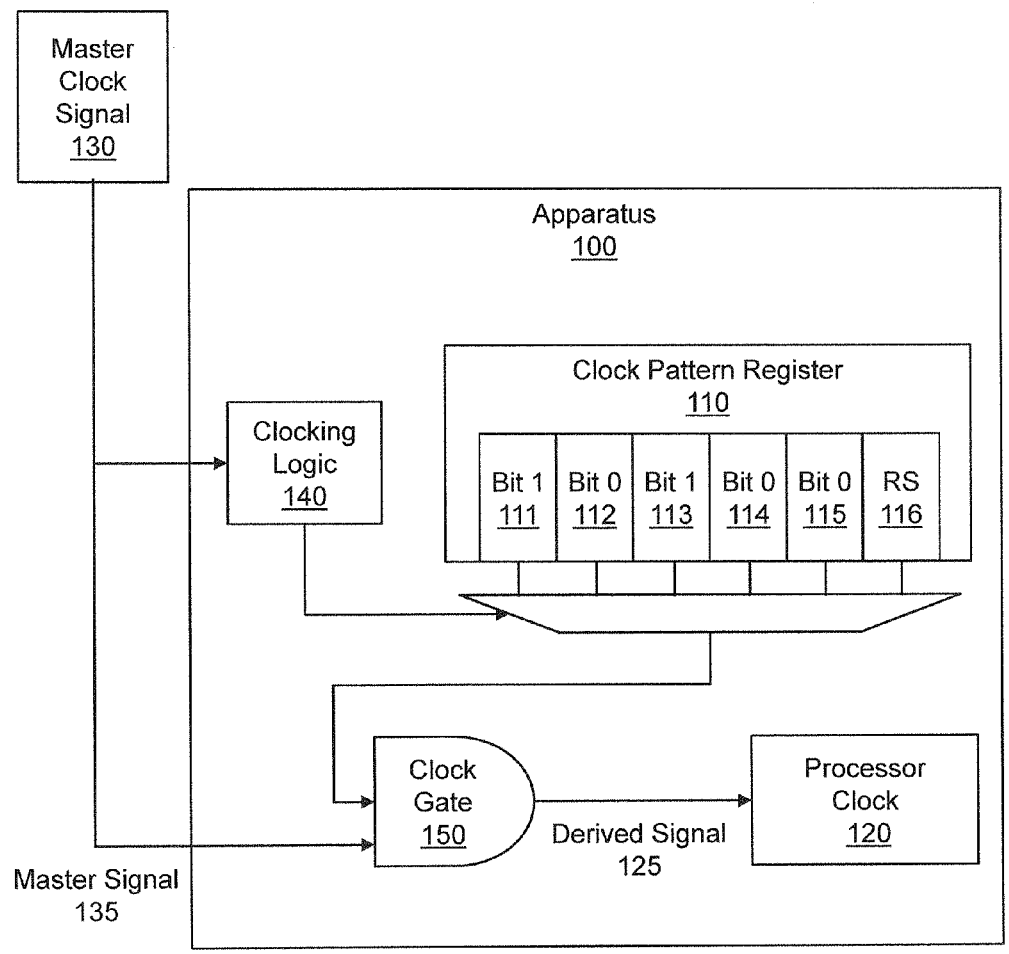
FIG. 1 illustrates one embodiment of an apparatus associated with controlling a clocking rate of a processor clock.

With reference to FIG. 1, one embodiment of an apparatus 100 associated with controlling a clocking rate of a processor clock 120 is shown. The apparatus 100 may be a processor core implemented in a device (e.g., computer, tablet, cellular phone). A master clock 130 provides a master clock signal 135 that acts as a timing mechanism for the apparatus 100. The processor clock 120 is controlled by a derived signal 125 that is based on the master clock signal 135.

The master clock signal 135 is received by a clocking logic 140 and a clock gate 150. The clocking logic 140 is sensitive to edges of the master clock signal 135. The clocking logic 140 may be sensitive to a rising edge, falling edge, or both the rising and falling edges of the master clock signal 135. When an edge of the master clock signal 135 is received by the clocking logic 140, the clocking logic 140 selects a next bit in a clocking pattern register 110.

The clocking pattern register 110 is configured to store a set of bits 111-116 arranged in a clocking pattern, with each bit corresponding to a clock edge. When each consecutive edge of the master clock signal 135 is received, the clocking logic 140 selects the appropriate bit of the clocking pattern register 110 and, in cooperation with the clock gate 150, a determination is made whether to propagate that edge of the master clock signal 135 or not. When each clock edge is encountered, the clocking logic 140 advances one bit in the clocking pattern register 110. The pattern of the set of bits 111-116 indicates which clock edges are to be propagated (e.g., bits of value 1) or ignored (e.g., bits of value 0) by the processor clock 120.

For example, the bit 111 has a value of 1 to indicate that the corresponding edge of the master clock signal 135 should be propagated to the processor clock 120. The 1 bit is provided to the clock gate 150, which performs a logical AND on the 1 bit and the master clock signal 135 thereby propagating the master clock signal pulse in the derived signal 135. When the next edge of the master clock signal 135 is received by the clocking logic 140, the clocking logic 140 accesses the next bit 112. The bit 112 has a value of 0 to indicate that the corresponding edge of the master clock signal 135 should be ignored by the processor clock 120. The 0 bit is provided to the clock gate 150, which performs a logical AND on the 0 bit and the master clock signal 135 with the result that the master clock signal pulse is not propagated in the derived signal 125.

This process continues until the clocking logic 140 reaches a predetermined point in the clocking pattern register 110, at which point the clocking logic 140 starts again at the beginning of the clocking pattern register. For example, the bit RS 116 is a restart point. When the bit RS 116 is encountered by the clocking logic 140, the clocking logic 140 starts again at the bit 111 of the set of bits 111-116 of the clocking pattern register 110.

The bit of the clocking pattern register 110 selected by the clocking logic 140 and the master clock signal 135 are input to a clock gate 150 to determine whether or not to propagate a given master clock pulse. When the processor clock 120 is sensitive to either a rising or a falling master clock signal edge, but not both, the clock gate 150 is an AND gate as shown in FIG. 1. Alternatively, when the processor clock 120 is sensitive to both the rising and the falling master clock signal edge, the clock gate is a flip flop (not shown).

The clock gate 150 implements a logical conjunction of the selected bit of the clocking pattern register 110 and the master clock signal 135 to produce the derived signal 125 for the processor clock 120. For example, when the clock gate 150 receives a master clock signal pulse and a bit value of 1, the master clock signal pulse is propagated as a derived signal 125 to the processor clock 120. Alternatively, when the clock gate 150 receives a master clock signal 135 and a bit value of 0, the pulse is not propagated in the derived signal 125 to the processor clock 120. Put another way, the effective frequency of the processor clock 120 is defined by master clock signal pulses being selectively ignored in accordance with the clocking pattern stored in the clocking pattern register 110.

In this way the operating frequency of the processor can be precisely controlled, without the long re-synchronization period of modifying the clock controller by adjusting the clock dividers and the PLL. The speed with which changes can be made to the processor clock 120 is determined by the speed with which a new clocking pattern can be stored in the clocking pattern register 110. Such changes can be effected in nanoseconds, enabling finer grain control of the system and a faster response to hardware events (e.g., voltage drops).

Figure 2A:
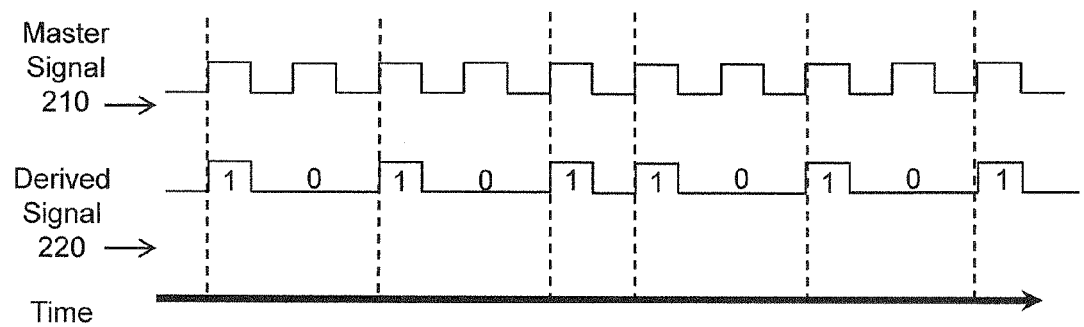
FIG. 2A illustrates one embodiment of a single edge sensitive design for controlling a clocking rate of a processor clock.

FIG. 2A compares a master clock signal to a derived signal for a clocking pattern of 1010110101. In this embodiment, components are clocked on a rising edge of clock pulses. The master clock signal pulses are represented by a square wave 210. When a first rising edge of the master clock signal 210 is encountered, a first bit value of a clocking pattern register is applied to the master clock signal 210. According to the pattern, a 1 is applied and a pulse is propagated in a derived signal 220. When the second rising edge of the master clock signal 210 is encountered, a 0 bit is applied. Accordingly, the second pulse of the master clock signal 210 is not propagated in the derived signal 220. Accordingly, pulses corresponding to 1's in the clocking pattern are propagated in the derived signal 220.

Figure 2B:
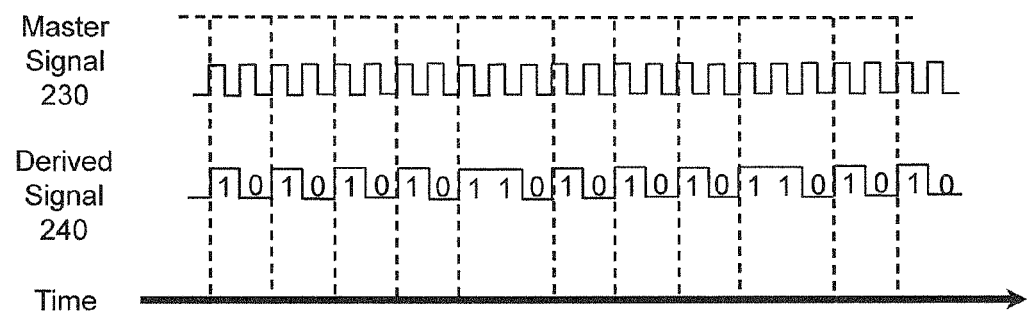
FIG. 2B illustrates one embodiment of a double edge sensitive design for controlling a clocking rate of a processor clock.

FIG. 2B compares a master clock signal to a derived signal for a clocking pattern of 1010110101. In this embodiment, components are clocked on a rising edge and a falling edge of clock pulses. The master clock signal pulses are represented by a square wave 230. When a first rising edge of the master clock signal 230 is encountered, a first bit value of a clocking pattern register is applied to the master clock signal 230. According to the pattern, a 1 is applied and a pulse is propagated in a derived signal 240. When a first falling edge of the master clock signal 230 is encountered, a 0 bit is applied. Accordingly, the second pulse of the master clock signal 210 is not propagated in the derived signal 240. Accordingly, pulses correspond to the rising and the falling edge of the master clock signal.

Figure 3:
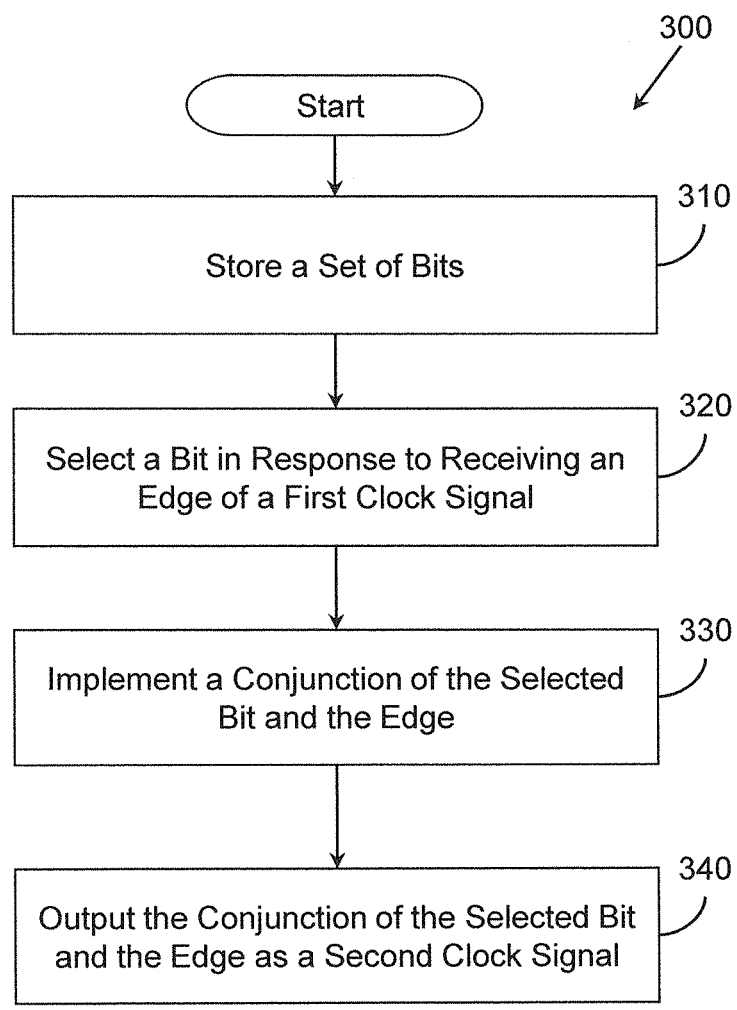
FIG. 3 illustrates one embodiment of a method associated with controlling a clocking rate of a processor clock.

FIG. 3 illustrates one embodiment of a method associated with controlling a clocking rate of a processor clock. At 310, the method includes storing a set of bits. The set of bits is arranged in a clocking pattern. At 320, a bit of the set of bits is selected in response to receiving an edge of a first clock signal. With each subsequent edge of the first clock signal, a next bit is selected in the clocking pattern. The first clocking signal may be a series of pulses that includes any type of waveform (e.g., sine wave, square wave, triangle wave, sawtooth wave). If the waveform is a sine waveform, an edge may be registered at the apex of the peak.

At 330, a conjunction of the selected bit and the edge is implemented. The clocking pattern specifies which edges of a first clocking signal to propagate and which edges to ignore. For example, the clocking pattern may include 1's or 0's, with 1's indicating edges to propagate and 0's indicating edges to ignore. The clocking pattern may be programmable and/or multiple clocking patterns may be stored for use in different situations. To modify the performance of a component associated with the first clock clocking signal, the clocking pattern may be adjusted accordingly.

At 340, the method includes outputting the conjunction of the selected bit and the edge of the first clock signal as a second clock signal. The second clock signal acts as a clock signal for one or more processors.

Figure 4:
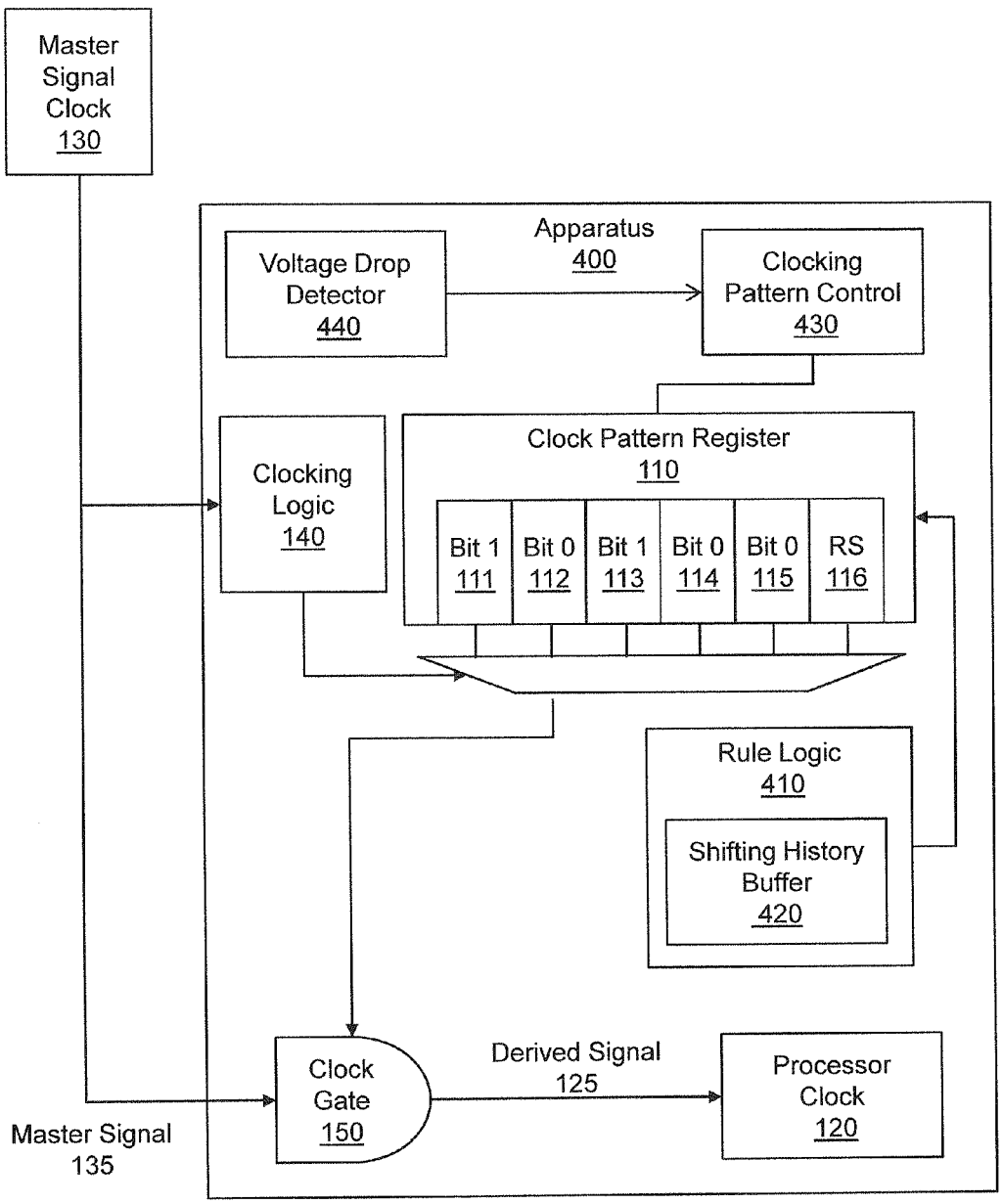
FIG. 4 illustrates one embodiment of an apparatus associated with controlling a clocking rate of a processor clock.

FIG. 4 illustrates one embodiment of an apparatus 400 associated with controlling a clocking rate of a processor clock. The apparatus 400 includes a rule enforcement logic 410. The rule enforcement logic 410 modifies a clocking pattern so that the clocking pattern conforms to rules set by the user. The user may define rules to prevent the use of clocking patterns that the system is unable to comply with. In some instances, a certain clocking pattern may cause unpredictable or incorrect operation. For example, two different domains may need to share a clock edge to exchange data correctly, or a condition inside the system may require a minimum clock period. The rule enforcement logic 410 modifies the clocking pattern to meet the requirements of rules for the system.

In one embodiment, the rule enforcement logic 410 includes a shifting history buffer 420 that records the previous clocking pattern bits, and validates a next clocking pattern bit based on the history and any rules. The shifting history buffer 420 stores a predetermined number of previously selected bits from the clocking pattern register 110.

If the clocking pattern violates the rule, the rule enforcement logic 410 alters the bit values so as to not violate the rule. For instance, a rule requiring a minimum period causes the rule enforcement logic 410 to force the clocking pattern to include 0s until sufficient time has passed since the last pulse. These rules may be change over time. For example, if a low power mode is entered, an external power control interface may inform the rule enforcement logic 410 that the minimum period has changed. The rule enforcement logic 410 would then override the clocking pattern when necessary to meet the minimum period.

In another embodiment, the apparatus 400 includes a clocking pattern control 430. The clocking pattern register 110 may store multiple clocking patterns. The clocking pattern control 430 selects the clocking pattern for the clocking pattern register 110 to employ based on operating conditions and/or desired performance parameters. Operating conditions include present operating characteristics of the apparatus 400 such as the operating temperature or power consumption. For example, when the operating temperature increases, the clocking pattern control 430 may select a clocking pattern that slows the frequency of the derived signal. Desired performance parameters specify some aspect of the processor's performance, such as a desired processor speed or a desired power consumption. The clocking pattern control 430 selects an appropriate clocking pattern to achieve the desired processor operation.

In one embodiment, the apparatus includes a voltage drop detector 440. The voltage drop detector monitors the system for voltage drops. Voltage drops may be caused by power noise, inductive effects, or when a temperature sensor senses that the processor temperature has risen to an atypical level. The voltage drop detector 440 senses when the voltage begins to drop and provides a warning signal to the clocking pattern control 430. The clocking pattern control 430 can adjust the clocking pattern in the clocking pattern register 110 to lower the frequency of the derived signal so that the minimum voltage needed to run the processor does not exceed the available voltage.

Figure 5:
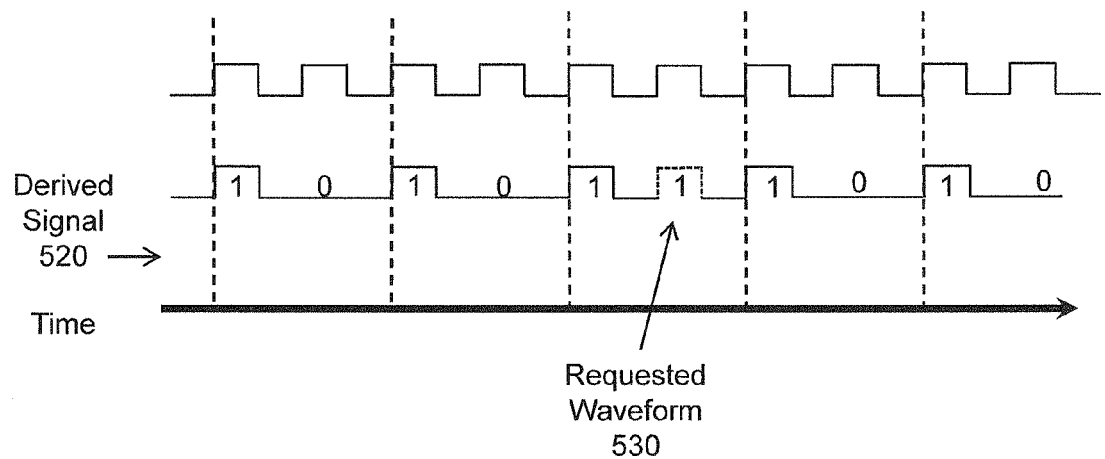
FIG. 5 illustrates one embodiment of a waveform for controlling a clocking rate of a processor clock.

FIG. 5 illustrates how the rule enforcement logic may handle a clocking pattern that violates a rule. A rule specifies that there must be a minimum of a two pulse period. The clocking pattern produces a derived signal 520 that includes a requested waveform 530 that violates the rule, as indicated, because it does not abide by the minimum period. The rule enforcement logic determines that the clocking pattern violates the rule and adjusts the clocking pattern so that the clocking pattern conforms to the rule. For example, the 1 bit that produces the requested waveform 530 is changed to a 0. Accordingly, the derived pulse 520 is adjusted to remove the requested waveform 530.

Figure 6:
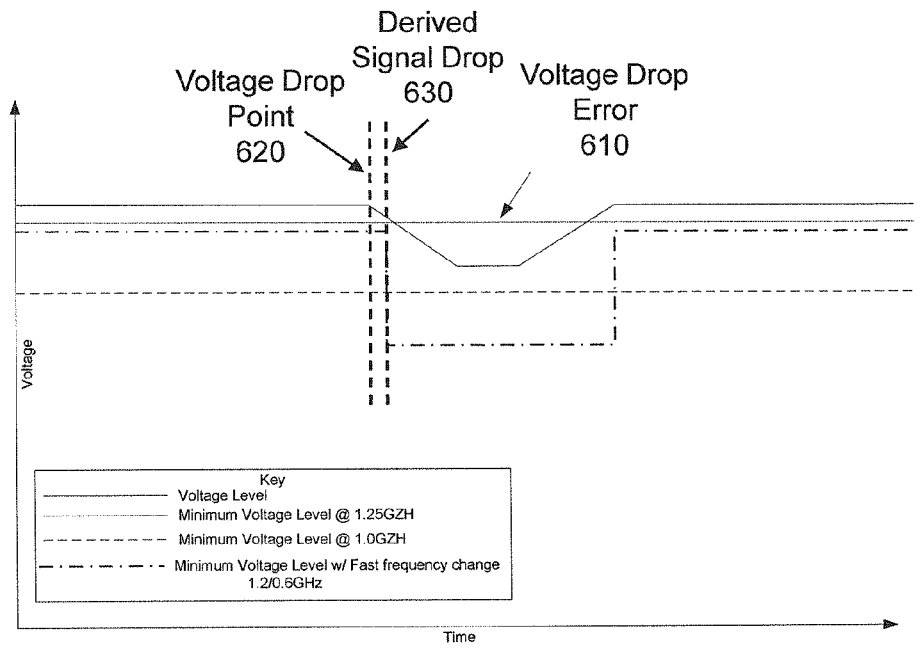
FIG. 6 illustrates an example of conventional clock scaling as compared to an example embodiment of controlling a clocking rate of a processor clock.

FIG. 6 compares the performance of conventional clock scaling to clocking pattern control of a processor clock. A voltage drop error 610 causes the voltage of the system to drop below the minimum voltage level for operation at 1.25 GZH. Conventionally, a system could not adjust the clock frequency quickly enough to compensate for the lower voltage and performance would suffer. The conventional solution to the problem was to increase the guard band on the clock speed so that the processor is clocked at a lower speed than could be supported by existing voltage. Therefore, increasing the guard band lowers the processor speed to attempt to compensate for slow clock scaling.

The voltage drop detector (as shown as 440 of FIG. 4) senses when the voltage begins to drop at the point 620. In response to sensing the voltage drop at 620, the frequency of the derived signal is reduced at 630 by altering the clocking pattern. The minimum voltage needed to run the processor never exceeds the available voltage. The clock speed can rapidly respond to voltage drops by interfacing the voltage drop detector directly to the control of the clock edges. By being able to respond quickly to changes in voltages, the guard band can be reduced, allowing the processor to run at a higher frequency to provide the desired power and performance.

Figure 7:
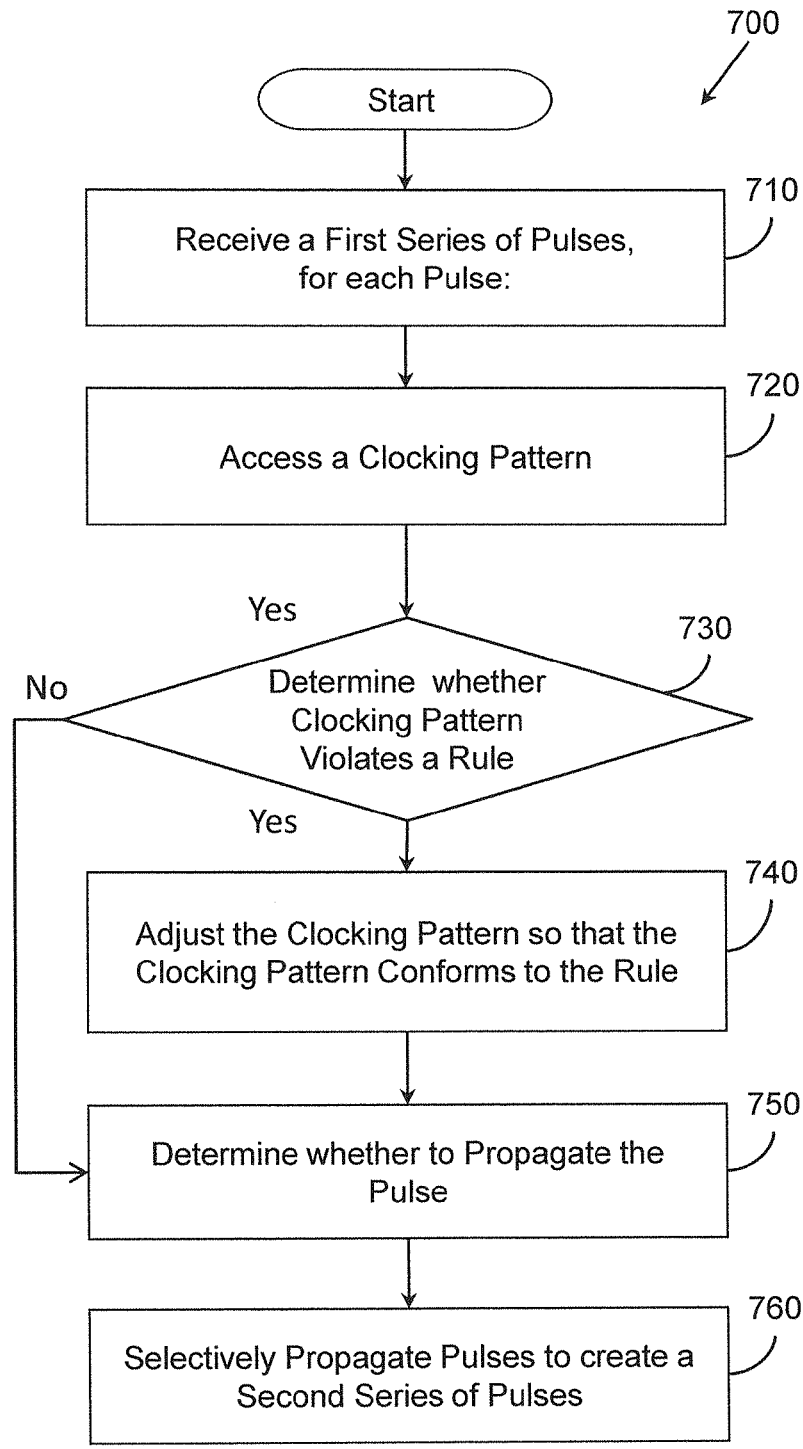
FIG. 7 illustrates one embodiment of a method associated with controlling a clocking rate of a processor clock.

FIG. 7 illustrates one embodiment of a method 700 associated with controlling a clocking rate of a processor clock. At 710 the method includes receiving a first series of pulses from a first clock. For each pulse the method includes accessing a clocking pattern at 720. At 730, at least one rule is accessed to determine whether the clocking pattern violates the rule. The rules may ensure that the hardware is able to function. If the clocking pattern violates any rule, the method proceeds to 740.

At 740, the clocking pattern is adjusted so that the clocking pattern conforms to the rule. For example, in one embodiment the clocking pattern is stored in a clocking pattern register. The clocking pattern may be adjusted by changing bits received from the clocking pattern register. Alternatively, the bits in the clocking pattern register may be changed to a different value. Once the clocking pattern has been adjusted, the method proceeds to 750, where the method determines whether to propagate pulse based on the adjusted clocking pattern.

If at 730 it is determined that the clocking pattern does not violate the rule the method proceeds to 750. At 750, the method determines whether to propagate the pulse based on the clocking pattern. The clocking pattern specifies which pulses of the first series of pulses to propagate and which pulses to ignore. At 760, the method includes selectively propagating pulses according to the clocking pattern to create a second series of pulses. The second series of pulses is an amalgamation of the first series of pulses and the clocking pattern.

Figure 8:
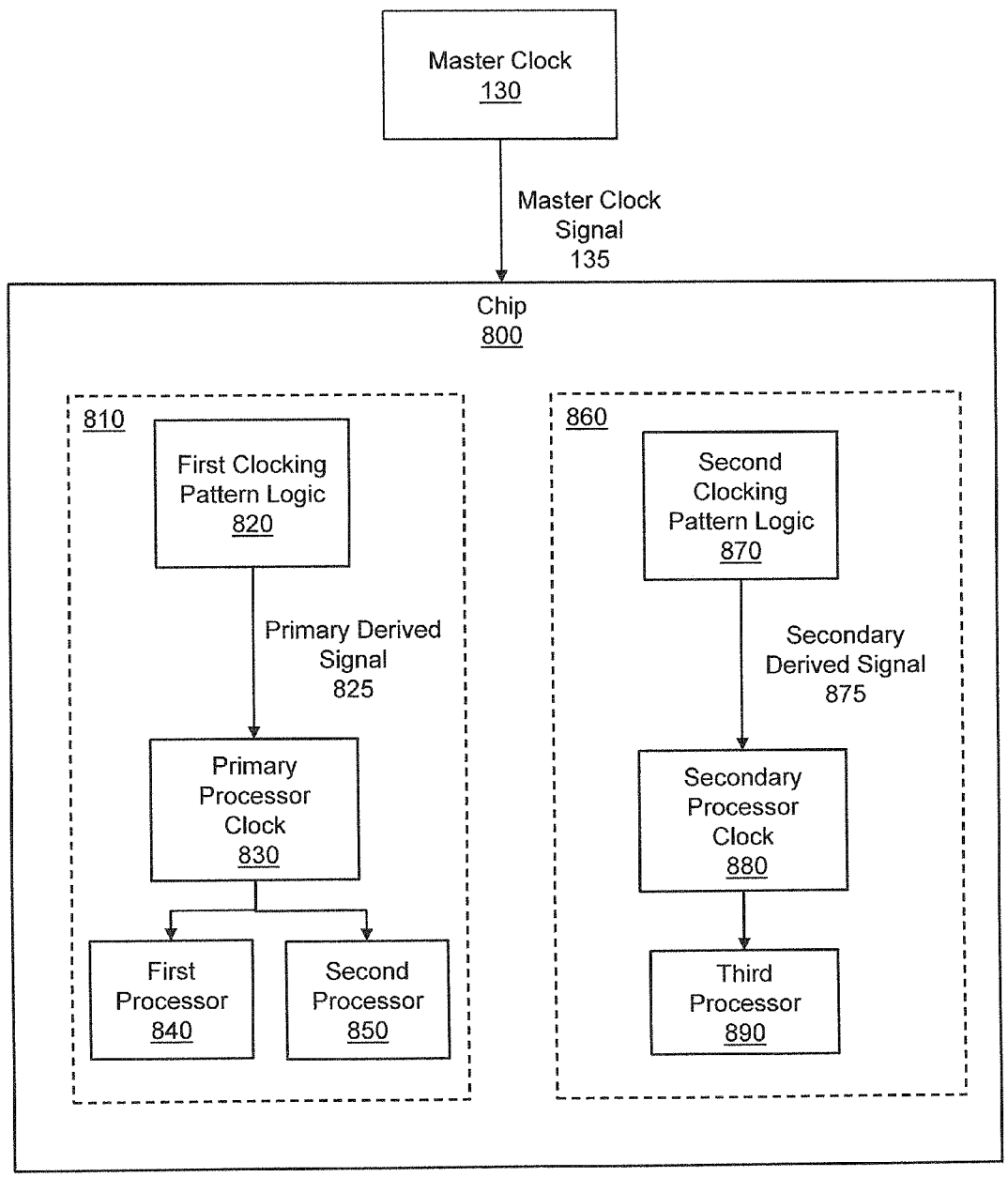
FIG. 8 illustrates one embodiment of a device associated with controlling a clocking rate of a processor clock.

FIG. 8 illustrates one embodiment of a device 800 associated with controlling a clocking rate of a processor clock. A first group of components 810 and a second group of components 860 are located on the chip 800. The chip 800 receives a master clock signal 135 from a master clock 130.

The first group of components 810 includes a first clocking pattern logic 820, a primary processor clock 830, a first processor 840, and a second processor 850. The first clocking pattern logic 820 applies a first clocking pattern to the master clock signal 135 to produce a primary derived signal 815. The primary processor clock 830 receives the primary derived signal 825 and provides the primary derived signal 825 to a first processor 840 and a second processor 850. Accordingly, the first processor 840 and the second processor 850 both run at a clock rate defined by the primary derived signal 825.

Figure 9:
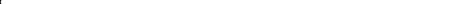
FIG. 9 illustrates one embodiment of noise spreading associated with controlling a clocking rate of a processor clock.

The second group of components 860 includes a second clocking pattern logic 870, a secondary processor clock 880, and a third processor 890. The second clocking pattern logic 870 applies a second clocking pattern to the master clock signal 135 to produce a secondary derived signal 875. The secondary processor clock 880 receives the secondary derived signal 875 and provides the secondary derived signal 875 to a third processor 890. The first clocking pattern and the second clocking pattern may be different so that multiple processors on the chip 800 are clocked differently. In this way the operating frequency of multiple processors can be individually controlled on chip FIG. 9 illustrates one embodiment of noise spreading associated with controlling a clocking rate of a processor clock. To cause a processor to run at 75% power, 75% of pulses of the master clock signal are propagated to the processor. In one embodiment, a clocking pattern includes 1's or 0's, with 1's indicating pulses to propagate and 0's indicating pulses to ignore. Therefore, to run at 75% power three out of four values are 1s. Clocking pattern 910 is one example of a clocking pattern that when combined with a master clock signal will result in a derived signal 920 that causes the processor to run at 75% power and speed.

The clocking pattern 910 has three 1's followed by 0 and then the clocking pattern is restarted. The repetitive nature of the short clocking pattern 910, results the derived signal 920 being susceptible to noise because the derived signal 920 is subject to increased resonance. To mitigate the effects of noise, the clocking pattern 910 can be lengthened to give the clocking pattern a larger period, thereby spreading the noise caused by the clocking pattern. For example, longer clocking pattern 930 has three values being 1 for every four values, and therefore, causes a processor to run at 75% power. However, because longer clocking patter 930 is repetitive on a larger period, the resulting derived signal 940 has reduced noise.

Clocking processors using a clocking pattern applied to the master clock signal provides a fast and flexible way to changing processor clock signals. Using a clocking pattern stored in a register reduces the re-synchronization period. The speed with which changes can be made to a processor clock is determined by the speed with which a new clocking pattern can be stored in the clocking pattern. Such changes can be effected in nanoseconds, enabling finer grain control of the system and a faster response to hardware events (e.g., voltage drops).

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus comprising:
a register configured to store a set of bits arranged in a clocking pattern, wherein the clocking pattern is configured to be applied to a first clock signal to generate a second clock signal for clocking a component of the apparatus;
a rule enforcement logic configured to enforce at least one user defined rule on the clocking pattern, by:
determining whether the clocking pattern violates the at least one user defined rule including determining whether the clocking pattern produces a clock signal that causes an unpredictable operation of the component being clocked, in view of the user defined rule; and
in response to determining that the clocking pattern violates the user defined rule, adjusting the clocking pattern such that the clocking pattern conforms with the at least one user defined rule:
a selector configured to select a bit of the set of bits in the register in response to receiving an edge of the first clock signal such that, with each edge of the first clock signal, the selector selects a next bit in the clocking pattern; and
a clock gate configured to:
(i) implement a conjunction of the selected bit from the clock pattern and the edge from the first clock signal, and
(ii) output the conjunction of the selected bit and the edge as the second clock signal for clocking at least the component;
wherein the rule enforcement logic comprises:
a shifting history buffer configured to store a predetermined number of previously selected bits from the register,
wherein the rule enforcement logic is configured to compare contents of the shifting history buffer to the at least one user defined rule that is stored to determine if the clocking pattern violates the at least one user defined rule.

2. The apparatus of claim 1, wherein the edge is a selected one of a rising edge or a falling edge from the first clock signal, and wherein the gate is a logical AND gate.

3. The apparatus of claim 1, wherein the edge is either a rising edge or a falling edge from the first clock signal, and wherein the gate is a flip flop.

4. The apparatus of claim 1, wherein the predetermined number of previously selected bits is determined with reference to a next bit in the clocking pattern.

5. The apparatus of claim 1, further comprising a clocking pattern control configured to select a clocking pattern based, at least in part, a predetermined operating temperature, a predetermined power rate, or on an operating condition.

6. The apparatus of claim 1, further comprising a clocking pattern control configured to select a clocking pattern that is based, at least in part, on a desired power consumption, a desired processor speed, or a desired performance parameter.

7. A method, comprising:
storing, in a memory, a set of bits arranged in a clocking pattern;
determining whether the clocking pattern violates a user defined rule by determining whether the clocking pattern produces a clock signal that causes, based on the user defined rule, an unpredictable operation of a component being clocked;
wherein the determining comprises:
storing, in a buffer, a predetermined number of previously selected bits from the memory; and
comparing contents of the buffer to the user defined rule that is stored to determine if the clocking pattern violates the user defined rule;
in response to determining that the clocking pattern violates the user defined rule, adjusting the bits in the clocking pattern such that the clocking pattern conforms to the user defined rule;
in response to receiving an edge of a first clock signal, selecting a bit of the set of bits in the clocking pattern such that, with each edge of the first clock signal, a next bit is selected in the clocking pattern; and
for each edge of the first clock signal,
(i) implementing a conjunction of the selected bit from the clocking pattern and the edge from the first clock signal, and
(ii) outputting the conjunction of the selected bit and the edge as a second clock signal for clocking the component.

8. The method of claim 7, further comprising:
adjusting the clocking pattern based, at least in part, on an operating condition.

9. The method of claim 7, further comprising:
adjusting the clocking pattern based, at least in part, on a desired performance parameter.

10. The method of claim 7, further comprising:
adjusting the clocking pattern based, at least in part, on noise power of the second clock signal.

11. The method of claim 7, further comprising:
identifying a restart point in the clocking pattern; and
reinitiating the clocking pattern from a beginning point in the clocking pattern.

12. The method of claim 7, further comprising:
detecting a voltage drop; and
in response to detecting a voltage drop, adjusting the clocking pattern to reduce the frequency of the second clock signal.

13. An integrated circuit device comprising:
a plurality of processors;
a register configured to store a set of bits arranged in a clocking pattern;
a rule enforcement logic configured to enforce at least one user defined rule on the clocking pattern, by:
determining whether the clocking pattern violates the at least one user defined rule by determining whether the clocking pattern produces a clock signal that causes an unpredictable operation of the plurality of processors being clocked, in view of the user defined rule; and
in response to determining that the clocking pattern violates the user defined rule, changing the bits in the clocking pattern such that the clocking pattern conforms with the at least one user defined rule;
a clocking pattern logic comprising:
a selector configured to select a bit of the set of bits in the register in response to receiving an edge of a first clock signal such that, with each edge of the first clock signal, the selector selects a next bit in the clocking pattern; and
a clock gate configured to
(i) implement a conjunction of the selected bit from the clocking pattern and the edge from the first clock signal, and
(ii) output the conjunction of the selected bit and the edge as a second clock signal that is connected to the plurality of processors for clocking one or more of the plurality of processors; and a shifting history buffer configured to store a predetermined number of previously selected bits from the register that were selected by the selector;

wherein the rule enforcement logic is further configured to compare contents of the shifting history buffer to the at least one user defined rule that is stored to determine if the clocking pattern violates the at least one user defined rule.

14. The integrated circuit device of claim 13, wherein the clocking pattern logic comprises:

a first clocking pattern logic to generate a primary derived signal from a master clock signal and a first clocking pattern; and a second clocking pattern logic to generate a secondary derived signal from a master clock signal and a second clocking pattern.

15. The integrated circuit device of claim 14, wherein:

a first processor is clocked by the primary derived signal; and a second processor is clocked by the secondary derived signal.

16. The integrated circuit device of claim 14, wherein the clocking pattern logic includes a clocking pattern control configured to select the first clocking pattern or the second clocking pattern based, at least in part, on operating conditions or desired performance parameters.

17. The integrated circuit device of claim 13, wherein the edge of the first clock signal is a rising edge or a falling edge in the first clock signal.

* * * * *